United States Patent [19]

Bafford et al.

[11] Patent Number: 5,461,103

[45] Date of Patent: Oct. 24, 1995

[54] PROCESS FOR PRODUCING A STABLE AQUEOUS PRESSURE SENSITIVE ADHESIVE POLYMER EMULSION

[75] Inventors: Richard A. Bafford, Macungie; Peter Tkaczuk, Emmaus, both of Pa.

[73] Assignee: Air Products and Chemicals, Inc., Allentown, Pa.

[21] Appl. No.: 265,523

[22] Filed: Jun. 24, 1994

Related U.S. Application Data

[63] Continuation-in-part of Ser. No. 59,845, May 11, 1993, abandoned.

[51] Int. Cl.⁶ .................................................. C08F 2/22
[52] U.S. Cl. ........................... 524/460; 524/458; 523/201
[58] Field of Search ........................... 523/201; 524/458, 524/460

[56] References Cited

U.S. PATENT DOCUMENTS

| | | | |
|---|---|---|---|
| 4,151,143 | 4/1979 | Blank et al. | 260/296 |
| 4,468,498 | 8/1984 | Kowalski et al. | 525/301 |
| 4,668,730 | 5/1987 | Iovine et al. | 524/460 |
| 4,820,762 | 4/1989 | Tsaur | 524/460 |
| 4,845,149 | 6/1989 | Frazee | 524/458 |
| 4,879,333 | 11/1989 | Frazer | 524/460 |
| 4,894,397 | 1/1990 | Morgan et al. | 523/201 |
| 4,923,919 | 5/1990 | Frazee | 524/460 |

FOREIGN PATENT DOCUMENTS

| | | |
|---|---|---|
| 814528 | 6/1969 | Canada . |
| 1107249 | 3/1968 | United Kingdom . |

OTHER PUBLICATIONS

Handbook of Adhesives, Third Edition, edited by Irving Skeist, von Nostrand, Reinhold, NY 1989 pp. 644–645.

*Primary Examiner*—Romulo H. Delmendo
*Attorney, Agent, or Firm*—Michael Leach; William F. Marsh

[57] ABSTRACT

A process for producing a stable aqueous adhesive polymer emulsion which comprises (a) preparing a substantially alkali insoluble, low molecular weight carboxylate-containing first stage polymer by aqueous emulsion polymerization under acidic conditions, the first stage polymer containing 30–55 equivalent % carboxylic acid monomers and having a $Mn<15,000$ and a $Tg<25°$ C., (b) conducting a second emulsion polymerization in the presence of the first stage polymer under acid or basic conditions to produce a hydrophobic second stage polymer, and (c) adjusting the resulting two stage polymer emulsion to a $pH<4$.

23 Claims, No Drawings

PROCESS FOR PRODUCING A STABLE AQUEOUS PRESSURE SENSITIVE ADHESIVE POLYMER EMULSION

CROSS-REFERENCE TO RELATED APPLICATIONS

This application is a continuation-in-part of U.S. application Ser. No. 08/059,845 filed 11 May 1993 now abandoned.

FIELD OF THE INVENTION

This invention relates to stable, aqueous pressure sensitive adhesive polymer emulsions prepared by two-stage emulsion polymerization techniques.

BACKGROUND OF THE INVENTION

The process for producing pressure sensitive adhesive (PSA) coated labels currently used by the industry consists of applying a solvent based or water emulsion based PSA to a low energy surface (release sheet), drying the adhesive and transferring the dry adhesive to the label stock by laminating the adhesive coated release sheet to the back surface of the label stock. The face of the label may be printed by conventional printing technologies. The label is then die cut to predetermined dimensions.

To apply the label to a substrate, the label is first removed from the release sheet, the adhesive now bonded to the back side of the label and the adhesive coated side of the label pressed onto the substrate. In order for the adhesive coated label to cleanly debond from the release sheet, the surface energy of the release sheet must be significantly lower than the surface energy of the adhesive. For typical polyacrylate ester adhesives, the surface energy is about 28 to 35 dyne/cm. A preferred release sheet is a polydimethyl siloxane (silicone) coated web. Its surface energy is about 22 dyne/cm.

The application of solvent based PSA's to release sheets presented little problem to the industry because the surface tension of such adhesive solutions was about 20 to 25 dyne/cm, low enough to provide good wetting of the release sheet.

Driven by environmental pressures and the cost of organic solvent, the industry has increasingly turned to alternatives such as 100% solids PSA's and waterborne PSA's. Currently, water-borne adhesives are the adhesive of choice because 1004 solids PSA's lack the balance of adhesive properties required by the label industry.

However, the surface tension of conventional emulsion polymers is typically greater than 40 dyne/cm. Consequently, any attempt to coat such emulsions on low energy surfaces leads to rapid retraction (crawling) and/or cratering of the adhesive film.

While several formulating techniques have been used to resolve this problem, none are completely satisfactory. A resolution to this problem is needed by the industry especially since environmental regulations will significantly restrict the use of organic solvent based adhesives in the future.

Presently, the most often used approach to resolving the coatability problem of water based adhesives is to reduce the surface tension of the emulsion by the addition of so-called wetting agents. A typically used wetting agent is dioctyl sulfosuccinate. The minimum surface tension that can be attained using this wetting agent is about 30 dyne/cm. Its use will significantly reduce, but not completely eliminate, crawling and cratering.

Another approach is to increase the viscosity of the emulsion with suitable thickening agents. As the viscosity is increased the rate of retraction is reduced. If the viscosity of a typical emulsion adhesive is raised to about 3000 to 5000 centipoises (cps), the rate of retraction and crater formation is sufficiently reduced such that on high speed coating lines the wet adhesive is dried before cratering occurs.

A combination of the two approaches is more generally used. However, there are significant drawbacks to these approaches. While reducing surface tension and increasing viscosity can improve coatability, leveling is improved by increasing surface tension and reducing viscosity.

Another problem associated with the use of wetting agents is their effect on adhesive performance. Shear adhesion and tack are reduced in the presence of dioctyl sulfosuccinate. Moisture sensitivity also increases.

Still another problem associated with wetting agents is foaming. Foaming can lead to loss of control of dry adhesive deposit level. Foaming can produce housekeeping problems if adhesive foams out of the applicator pan. Dried foam can deposit fish eyes in the adhesive coating.

The introduction of defoaming agents can create another set of problems. Particles of defoamer can serve as nucleating sites for formation of craters in the wet adhesive coating.

Yet another problem associated with wetting agents and defoamers is their time dependent performance in adhesive emulsions. The wetting agent and/or defoamer can be adsorbed by the polymer particles, thereby altering the coating performance of the emulsion. This leads to product rework and/or scrap.

The ideal coater ready PSA emulsion would be one which would be suitable for coating low energy surfaces at a viscosity as low as 500 cps without requiring the use of wetting agents or defoamers yet still have a relatively high surface tension to insure good leveling.

U.S. Pat. No. 4,668,730 addresses the problem of coating on low energy surfaces. The patent discloses a process for making an emulsion polymer adhesive which is characterized by superior rheological properties. The process consists of conducting the emulsion polymerization in the presence of an aqueous solution of alkali soluble oligomer. The alkali soluble oligomer is prepared by solution polymerization of a mixture consisting of esters of acrylic and/or methacrylic acid, an ethylenically unsaturated mono- or dicarboxylic acid, an acrylic or methacrylic ester of a polyalkylene oxide and, optionally, hydroxyalkyl (meth)acrylate or (meth)acrylamide.

The disadvantages of such a process are that a separate solution polymerization using an organic solvent is required and that the solvent must be stripped from the oligomer before it can be used in the subsequent aqueous emulsion polymerization. Another disadvantage is that the emulsion polymerization can only be conducted under alkaline conditions (the oligomer is dissolved in water by converting it to the ammonium salt).

Other patents describing emulsion polymerization in the presence of an alkali soluble oligomer include U.S. Pat. Nos. 4,845,149; 4,923,919; 4,879,333; 4,820,762; 4,151,143; and G.B. 1,107,249.

JP 91/02,293 discloses a low viscosity PSA emulsion having good wettability to release papers. The process consists of acrylate ester aqueous emulsion polymerization under alkaline conditions in the presence of a polymerizable emulsifier. However, the reported viscosity, 4000 cps, of the latex, under industry standards, would not be considered low viscosity. Most label converters in the United States coat adhesives having a viscosity of 500 to 1500 cps.

U.S. Pat. No. 4,894,397 discloses a process for producing a stabilized, inverted core-shell polymer emulsion by preparing a hydrophilic polymer and contacting the hydrophilic polymer with a hydrophobic monomer characterized in that the pH of the inverted core-shell polymer emulsion is adjusted to dissolve the hydrophilic polymer. The hydrophilic first stage polymers are alkali soluble.

U.S. Pat. No. 4,923,919 discloses emulsion polymer pressure sensitive adhesives made by a second stage emulsion polymerization. of a first stage polymer at a pH of at least about 7. Frazee's first stage polymers are prepared by solution polymerization according to CA 814,528.

U.S. Pat. No. 4,468,498 discloses the production of water-insoluble particulate heteropolymers made by sequential emulsion polymerization in which a "core" of a polymeric acid is at least partially encased in a "sheath" polymer that is permeable to a volatile base adapted to cause swelling of the core by neutralization. It is suggested that the dispersions of the invention may be used as quick tack adhesives.

SUMMARY OF THE INVENTION

The present invention is directed to a stable aqueous pressure-sensitive adhesive polymer emulsion and the process for preparing it. The process comprises:

(a) preparing a substantially alkali insoluble, low molecular weight carboxylate-containing first stage polymer by aqueous emulsion polymerization under acidic conditions, the first stage emulsion polymer containing 30–55 equivalent % (eq %) carboxylate monomer and having a Mn$\leq$15,000 and a Tg<25° C. as measured by Dynamic Mechanical Analysis, (b) conducting a second emulsion polymerization in the presence of the first stage polymer to produce a hydrophobic second stage polymer under acidic or basic conditions, and (c) optionally, adjusting the resulting two stage polymer emulsion to a pH$\geq$4.

The resulting emulsion polymer pressure sensitive adhesive has the ability to coat low energy surfaces without retracting (crawling) or cratering and will rapidly level. The coatability of the emulsion polymer improves as the pH of the aqueous emulsion increases. Thus, the pH is desirably>6. The resultant emulsion polymers can be cast or coated on low energy surfaces (as low as 22 dyne/cm) without the use of wetting agents or viscosifiers, even at viscosities as low as 200 cps and dynamic surface tensions greater than 50 dyne/cm. The peel adhesion and tack of these polymers can be enhanced through blending with a variety of tackifying resin emulsions. These include tackifiers based on rosin esters, rosin acids, and blends of these resins with hydrocarbon resins.

DETAILED DESCRIPTION OF THE INVENTION

The invention is a PSA composition prepared by a process known as a two stage, or sequential, free radical emulsion polymerization. In the first stage, a low molecular weight, alkali insoluble carboxylated polymer (oligomer) is prepared under acidic conditions, i.e., pH<7, preferably pH 1.5 to 6, by aqueous emulsion polymerization. Attempts to prepare the first stage polymer by solution polymerization results in an alkali soluble polymer which is not dispersible under acidic conditions.

The second stage consists of emulsion polymerizing monomers capable of free radical polymerization in the presence of the first stage oligomer under alkaline or acidic conditions, preferably pH 4 to 8, especially pH 4 to 6. If necessary for better coatability, the pH of the resulting emulsion is adjusted to pH $\geq$4. Normally, adjustment is upwards to a pH>6, preferably>7.

Monomers suitable for the production of the first stage low molecular weight polymer include esters of acrylic or methacrylic acid with $C_1$–$C_{12}$ alcohols such as methyl (meth)acrylate, ethyl (meth)acrylate, butyl (meth)acrylate, ethylhexyl acrylate and octyl acrylate, vinyl esters of $C_2$–$C_5$ carboxylic acids such as vinyl acetate and vinyl propionate, acrylonitrile, styrene, $\alpha$-methylstyrene, and olefinically unsaturated $C_3$–$C_6$ carboxylic monomers such as acrylic acid, methacrylic acid, itaconic acid and maleic acid. The term "(meth)acrylate" is shorthand for acrylate and methacrylate.

A low level of a suitable surfactant may be used but is not necessarily required.

The molecular weight (Mn) of the first stage polymer is preferably below about 15,000, i.e., an oligomer. (All molecular weights given are number average molecular weights Mn unless otherwise specified). A more preferred range is 5000 to 10,000. The molecular weight of the first stage polymer significantly influences the emulsion properties.

The first stage polymer must be substantially alkali insoluble. The alkali insolubility is dictated by the ratio of the hydrophobic to hydrophilic monomers in the first stage polymer. As used herein, the term "substantially alkali insoluble" means that the polymer is incapable of being dissolved to more than a minor degree in an aqueous medium upon adjustment of the pH to greater than 7. First stage polymers containing acid-functional groups, i.e., possessing "acidic" functionality, in an insufficient amount compared to the hydrophobic monomers will not be solubilized in aqueous media upon addition of alkali to pH>7.

The degree of alkali solubility of the first stage polymer can be estimated by measuring the change in optical density (O.D.) of the emulsion before and after adjustment of the pH to >7.5 with an alkaline material.

"Hydrophilic monomer" is meant to include those monomers that form polymers which are capable of being dissolved in an aqueous medium at a neutral pH or upon adjustment of the pH to greater than 7. "Hydrophobic monomer" is meant to include those monomers that form polymers which are not capable of being dissolved in a neutral aqueous medium or upon adjustment of the pH.

Typical hydrophobic monomers include alkyl acrylates where the alkyl group contains from 4 to 12 carbon atoms, for example, 2-ethylhexyl acrylate, octyl acrylate and butyl acrylate. Typical hydrophilic monomers include acrylic acid, maleic acid, itaconic acid and methacrylic acid. Monomers such as vinyl acetate, acrylonitrile and methyl acrylate would fall into a class between those classes described as hydrophobic or hydrophilic.

Since the first stage polymer is substantially alkali insoluble, it must contain a sufficient level of hydrophobic monomer to impart substantial alkali insolubility but must contain sufficient hydrophilic monomer that the final composition be coatable on low energy surfaces. Thus, the first stage polymer contains about 30 to 55 eq % of carboxylic acid-containing monomers and preferably 35 to 50 eq %. The carboxylic monomer or mixture of carboxylic monomers should be such that most of the monomer will be preferentially polymerized in the micelles rather than in the continuous aqueous phase. A preferred mixture is from 0 to 5 eq % acrylic acid and 45 to 30 eq % methacrylic acid, based on first stage polymer.

The glass transition temperature (Tg) of the first stage polymer is preferably below about 25° C. for most applications where the final product is to be used for a pressure sensitive adhesive. However, there may be applications where a low tack or easily removable adhesive is desired, in which case the Tg can be higher than 25° C. The most preferred first stage polymers have a Tg of ≦0° C.

Since the molecular weight Mn of the first stage polymer is <15,000, preferably below about 10,000, it is necessary to use a chain transfer agent. Suitable chain transfer agents include those well known in the aqueous emulsion polymerization art such as dodecyl mercaptan, mercapto carboxylic acids and esters of mercaptocarboxylic acid. The only criterion is that it be effective at low levels, less than about 5% based on the weight of the monomer composition.

Polymerization can be initiated by those processes known in the art. For example, thermal initiation can be accomplished with thermally generated free radical sources such as ammonium persulfate, sodium persulfate or the like. Suitable polymerization temperatures are from about 70° to 90° C. The amount of thermal initiator used would be 0.5 to 5 wt %, based on monomers.

Polymerization can also be initiated by a redox system. Any suitable combination of oxidizing agent and reducing agent known in the art can be used, such as t-butyl hydroperoxide and sodium formaldehyde sulfoxylate. For redox initiation the preferred polymerization temperature is from about 40° to 70° C. Suitable amounts of oxidizing agent would be 0.01 to 3 wt %. The reducing agent is ordinarily added in the necessary equivalent amount.

In one preferred embodiment of a first stage polymerization, a monomer mixture of 10 wt % vinyl acetate, 60 wt % ethylhexyl acrylate, 28.1 wt % methacrylic acid and 1.9 wt % acrylic acid and containing 3.0 wt % dodecyl mercaptan (based on the weight of the monomers) is emulsified in 72 wt % water (based on weight of monomers) containing 24 of Abex JKB anionic surfactant (Rhone-Poulenc Inc.). The monomer emulsion is added over a 2 hour period to a 2% solution of ammonium persulfate in water while maintaining a temperature of 80° C.

The emulsion polymer had a molecular weight (Mn) of about 5000 and the emulsion was at pH 2.

A sample of the aqueous polymer emulsion diluted to 0.2% solids had an optical density of 2.9. A second sample adjusted to pH 7.5 and diluted to 0.2% solids had an optical density of 2.7. This indicates that the first stage polymer was substantially alkali insoluble.

When a portion of the hydrophobic monomer ethylhexyl acrylate was substituted with a less hydrophobic monomer such as butyl acrylate, then a 0.2% solids sample at 7.5 had an optical density of 0.06. Thus this polymer was substantially soluble in aqueous alkali.

It is readily apparent that the alkali solubility of the polymer is controlled by hydrophobic monomer content as is well known in the art.

In the second stage polymerization, the first stage polymer acts as a seed polymer. The reactor charge consists of sufficient seed polymer emulsion such that the resultant emulsion polymer coats low energy surfaces without the need of wetting agents or viscosifiers. Typically, the amount of seed polymer (dry basis) must be at least about 5 wt % of the resultant emulsion polymer solids up to about 25 wt %. A preferred level is from about 8 to 15 wt %. The amount of seed polymer used above the minimum amount required for coatability will be dictated by the adhesive performance desired such as peel adhesion. More first stage polymer means less peel adhesion.

The monomers suitable for the second stage polymer include those known to the art for the manufacture of adhesives and include esters of acrylic, methacrylic and/or maleic acids with $C_1$–$C_{12}$ alcohols such as methyl (meth)acrylate, ethyl (meth)acrylate, butyl (meth)acrylate, ethylhexyl acrylate and octyl acrylate, vinyl esters of $C_2$–$C_5$ carboxylic acids such as vinyl acetate and vinyl propionate, styrene, d-methylstyrene, acrylonitrile, $C_2$–$C_4$ hydroxyalkyl acrylate and methacrylate such as hydroxyethyl (meth)acrylate and hydroxypropyl (meth)acrylate, olefinically unsaturated $C_3$–$C_6$ carboxylic monomers such as acrylic acid, methacrylic acid, maleic acid, itaconic acid and inorganic esters of vinyl alcohol such as sodium vinyl sulfonate.

Small amounts of crosslinkable or crosslinking monomers can be used to alter adhesive properties as desired. Typical crosslinkable monomers include N-methylolacrylamide. Typical crosslinking monomers include the acrylic acid or methacrylic acid esters of polyols.

Polymerization of the second stage can be initiated by the same processes used in the first stage polymerization.

There are three approaches to two stage polymerization. A "one pot" system consists of preparing a sufficient amount of the first stage polymer followed by the addition of the second stage ingredients required to produce the final emulsion polymer. Alternatively, the first stage polymer emulsion is prepared and stored. A portion of the first stage polymer can then be used as the seed for subsequent second stage polymerizations.

A third approach consists of mixing the second stage monomers with the first stage polymer. A portion of this mixture and optionally water is charged to the reactor, the temperature is raised to the desired polymerization temperature and a small amount of the initiator is added. When polymerization begins, the remaining monomer/first stage polymer mixture and remaining initiator are added to the reactor over a 2 to 5 hour period.

Obviously, it would also be possible to charge a portion of the first stage polymer to the kettle, mix the remainder of the first stage polymer with the monomers and then proceed with the polymerization as described above.

This third procedure reduces or eliminates the "orange peel" effect (unevenness and fisheyes) in the emulsion polymer coating.

In a typical two stage polymerization, the reactor is charged with the required amount of seed emulsion (first stage polymer), optionally diluted with deionized water and/or, optionally, adjusted with an alkali, usually, aqueous ammonia. A mixture of those monomers to be used in the second stage polymerization is prepared. The monomer mixture may be used neat or emulsified in water using a small amount of a suitable surfactant or simply mixed with water. In the latter case, continuous mixing may be required to maintain the monomer mix in suspension.

Since one of the objectives in the design of the ideal emulsion polymer adhesive is the elimination of the need for defoaming agents, it is preferred to minimize the amount of surfactants used in both the first and second stage polymerizations.

An aqueous solution of the initiator and, if required, a separate aqueous solution of the reducing agent where a redox system is employed are prepared.

A buffering agent such as sodium bicarbonate or disodium phosphate may be employed and can be added to the monomer mixture if water is present in the mixture, may be added to the initiator solution, or may be metered in as a separate feed.

To the reactor charge of seed polymer emulsion is added about 1 to 5% of the monomer mixture and about 4 to 8% of the initiator solution. The air in the reactor is displaced with nitrogen and the contents of the reactor are heated to the desired polymerization temperature. When initiation occurs, as evidenced by an exotherm, the remaining monomer mixture and initiator solution are added to the reactor mixture over a predetermined time usually 2 to 5 hours.

After completion of the addition of the monomer mixture, the emulsion is held at a predetermined temperature for a predetermined time to continue polymerization of the monomers. An additional amount of initiator solution can be added to scavenge any residual unreacted monomer. Other methods of residual monomer removal may be employed such as distillation or steam stripping.

The final pH of the emulsion can be adjusted with an alkaline material such as aqueous ammonia or with a dilute solution of an acid such as acetic acid. In most cases where pH adjustment is necessary, it is adjusted upward with an alkaline material.

At this point the PSA emulsion may be blended with a tackifying resin dispersion in order to achieve enhanced peel adhesion and/or tack.

In order to bring the emulsion into the percent solids content and viscosity desired for coating, it may be necessary to dilute the emulsion with water. Occasionally, it might be necessary to employ a viscosifier to increase the viscosity of the emulsion. This depends on the coating device employed. It should be noted that the compositions of the instant invention do not require viscosifiers in order to be coatable on low energy surfaces.

In the following examples all reactions were carried out in glass or stainless steel reactors which were equipped with agitators, thermocouples and ports for the addition of raw materials. The reactors had jackets through which was circulated tempered water to maintain the proper reaction temperature. All polymerizations were conducted in a nitrogen atmosphere.

Emulsion viscosities were measured on a Brookfield model LV viscometer unless otherwise specified.

Optical densities of 0.2% solids dispersions were measured at 500 nanometers using a Hitachi UV-VIS spectrometer.

Non-volatile content of the emulsion polymers was determined by drying weighted amounts of the emulsion in a 150° C. oven for 30 minutes.

Adhesive testing generally followed the standard PSTC methods. Test substrates were 2 mil polyethylene terephthalate film and Kromkote™ 60 lb (27.2 kg) coated paper label stock. The test surface was stainless steel. Wet adhesives were cast on Polyslik™ siliconized polyethylene coated 90 lb (40.9 kg) paper. It is generally recognized in the art that Polyslik release sheet is one of the most difficult-to-coat substrates for water based adhesives. Dry adhesive deposit was about 25 g/m².

PSTC-1 Test method was used for 180° peel adhesion. 2.54 cm wide strips were laminated to stainless steel and conditioned for 30 minutes before testing.

Shear adhesion was measured using the PSTC-7 test. The contact area between the test sample and the stainless steel test surface was 1.27×1.27 cm and the load was 500 g. The time (hr) to bond failure was measured.

The loop tack was measured using a 2.54×20.32 cm strip of adhesive formed into a loop and applied across a 2.54 cm wide panel with minimal pressure so that the contact area is 6.45 cm² (one square inch), thus, the panel is perpendicular to the length of the adhesive strip. The strip is then pulled away from the panel at an angle of 90° at a rate of 30.48 cm per minute.

Probe tack measurements were performed in accordance with a test method based on ASTM test method D-2979. A Polyken™ probe task tester was used to make the measurements. The probe speed was 1 cm/sec and the dwell was 1 second.

EXAMPLE 1

First Stage Emulsion

A jacketed one-gallon stainless steel reactor was equipped with a turbine agitator, thermocouples and feed metering pumps.

To the reactor was charged 880 g deionized water. The reactor was sparged with nitrogen to displace the air. An initiator solution consisting of 80 g deionized water and 20 g ammonium persulfate was prepared. A monomer dispersion consisting of 920 g deionized water, 20 g Abex JKB surfactant, 128 g vinyl acetate, 768 g ethylhexyl acrylate, 24 g acrylic acid, 360 g methacrylic acid and 40 g n-dodecyl mercaptan was prepared.

The reactor contents were heated to 80° C. and when that temperature was reached, the initiator solution was added all at once. The monomer dispersion was added over a 2-hour period while maintaining the temperature at 80° C. After the addition was completed, the reaction was held at 80° C. for 30 minutes. A solution consisting of 2 g ammonium persulfate and 40 g water was added all at once and the reactor temperature raised to 90° C. to complete polymerization of any residual monomer. The emulsion was cooled and filtered. The pH of the emulsion was 2, the non-volatile content 40.16% and the viscosity using a #3 spindle was 36 cps at 30 rpm and 37 cps at 60 rpm.

If the emulsion is to be stored more than one month, the pH should be raised to 4.5. At about pH 4.5 the shelf life of the emulsion is more than one year.

Example 2

First Stage Emulsion

A first stage emulsion was prepared by the procedure of Example 1. The monomer dispersion was changed. Replacing the 768 g 2-ethylhexyl acrylate was 384 g butyl acrylate and 384 g ethylhexyl acrylate.

The pH of the emulsion was 1.7, the non-volatile content 40.58% and the viscosity using a #3 spindle was 8 cps at 30 rpm and 24 cps at 60 rpm.

The two first stage emulsions were characterized by their response to the addition of aqueous ammonia. Aqua ammonia (28% $NH_3$ solution in water) was added dropwise to stirred samples of the emulsions until the pH was about 7.5.

At pH 7.50, the Example 1 first stage emulsion had a viscosity of 76 cps at 30 rpm and 78 cps at 60 rpm while the viscosity of the Example 2 first stage emulsion was 888 cps at 30 rpm and 1,210 cps at 12 rpm. The pH adjusted mixtures were diluted to about 2% non-volatiles. Example 1 at 2.06% non-volatiles was a milky emulsion, while Example 2 at 2.23% non-volatiles was a clear solution.

Samples of the two emulsions as well as samples of the two emulsions adjusted to pH 7.5 were diluted to 0.2% non-volatiles and the optical densities measured.

| | Optical Density | |
|---|---|---|
| | pH 2 | pH 7.5 |
| Example 1 Emulsion | 2.94 | 2.74 |
| Example 2 Emulsion | 2.87 | 0.06 |

From the above data it is apparent that Example 1 emulsion is substantially insoluble under alkaline conditions, while Example 2 emulsion is soluble. The balance of hydrophilic and hydrophobic monomers in the first stage polymer control the alkali solubility of the polymer.

Examples 3 and 4

Alkali Insoluble First Stage Emulsions

Two additional alkali insoluble first stage emulsions were prepared using the procedure and composition of Example 1, except that in Example 3, the n-dodecyl mercaptan was reduced to 30 g and in Example 4, the n-dodecyl mercaptan was reduced to 20 g.

The molecular weights of Examples 1, 3 and 4 were determined using gel permeation chromatography with polystyrene standards.

TABLE 1

| Physical Properties of First Stage Polymers | | | | |
|---|---|---|---|---|
| Example | % Nonvolatiles | Viscosity (cps) | Mn | Mw |
| 1 | 40.16 | 36 | 5,100 | 11,300 |
| 3 | 39.93 | 20 | 6,900 | 22,400 |
| 4 | 39.97 | 20 | 8,100 | 23,700 |

Example 4a

An alkali insoluble first stage was prepared using the procedure and composition of Example 1 except that the initiator solution contained 14 g of sodium bicarbonate in addition to the ammonium persulfate. The pH of the emulsion was 3.62, the solids were 40.15% and the viscosity 24 cps at 30 rpm and 32 cps at 60 rpm.

Example 5

A 2 liter jacketed glass reactor was equipped with a turbine stirrer, thermocouple, feed line for nitrogen sparges and two metering pumps.

To the reactor was charged 182.9 g Example 1 first stage emulsion and 90 g deionized water. The pH was adjusted to 7.0 using aqua ammonia. The reactor was swept with nitrogen.

A monomer dispersion consisting of 113 g deionized water, 14.4 g Abex 23S surfactant (Rhone Poulenc), 8 g 25% solution of sodium vinyl sulfonate, 2 g acrylic acid, 400 g butyl acrylate, 40 g methyl acrylate and 12 g hydroxypropyl acrylate was prepared. The pH was adjusted to 7.0 with aqua ammonia.

An initiator solution consisting of 1.5 g sodium persulfate, 40 g deionized water and 2 g sodium bicarbonate was prepared.

Fifteen grams of the monomer dispersion was added to the reactor. The reactor contents were heated to 65° C. and 5 g initiator solution was added. Heating was continued until temperature reached 76° C. and the remaining monomer dispersion and initiator solution were added over a 2-hour period.

The emulsion was then held at 76° C. for 30 minutes. The temperature was raised to 80° C. and a solution of 0.5 g sodium persulfate in 10 g water was added all at once. The emulsion was held at 80° C. for minutes in order to scavenge any residual monomer. The emulsion was then cooled and filtered through a 150 mesh (100 micron) filter bag.

The non-volatile content was 56.57%, the pH 6.84 and the viscosity cps at 30 rpm and 548 cps at 60 rpm.

The emulsion was coated on Polyslik™ release paper. The emulsion coated the paper without cratering or crawling. No wetting agents were required. The wet adhesive coated sheet was dried at 70° C. for 10 minutes. There was no evidence of cratering or crawling of the dry adhesive. The deposit level was about 25 g/m².

Kromkote™ paper label stock was laminated to the adhesive coated release paper.

Example 6

A coater ready adhesive was prepared using the process and composition of Example 5 except that the pH of the reactor charge and the monomer dispersion were 5.5 instead of 7.0.

The filtered emulsion had a non-volatile content of 58.13%, the pH 5.81 and the viscosity 512 cps at 30 rpm and 350 cps at 60 rpm. The pH was adjusted above 7.0 and the wet adhesive coated without cratering or crawling.

The adhesives of Examples 5 and 6 were evaluated using the Pressure Sensitive Tape Council (PSTC) tests.

TABLE 2

| Example | 180° Peel Adhesion (N/m) | 178° Shear Adhesion (1.27 × 1.27 cm, 500 g load) (hr to failure) | Loop Tack (N/m) | Polyken Probe Tack (g) |
|---|---|---|---|---|
| 5 | 631 | 7.1 | 315 | 364 |
| 6 | 666 | 9.4 | 333 | 400 |

Example 7

A coater ready adhesive was prepared using the process and composition of Example 5 except that the pH's of the reactor charge and the monomer dispersion were 7.5 instead of 7.0. The sodium bicarbonate in the initiator solution was replaced by disodium phosphate (4 g).

The finished emulsion had a non-volatile content of 56.73%, pH 7.06 and the viscosity 520 cps at 30 rpm and 406 cps at 60 rpm.

As with Examples 5 and 6, the adhesive coated Polyslik release paper without cratering or crawling.

Example 8

A 2 liter jacketed glass reactor was equipped with a turbine stirrer, thermocouple, feed line for nitrogen sparge and two metering pumps.

To the reactor was charged 91.3 g of Example 1 first stage emulsion and 90 g water. The pH was adjusted to 5.5 using aqua ammonia. The reactor was swept with nitrogen.

A monomer dispersion consisting of 113 g deionized water, 4.8 Abex 23S surfactant, 8 g 25% solution of sodium vinyl sulfonate, 2 g acrylic acid, 400 g butyl acrylate and 12 g hydroxyethyl methacrylate was prepared. The pH was adjusted to 5.4 with aqua ammonia.

An initiator solution consisting of 1.5 g sodium persulfate, 40 g water and 2 g sodium bicarbonate was prepared.

Fifteen g of the monomer dispersion was added to the reactor. The reactor contents were heated to 65° C. and 5 g of initiator solution added. Heating was continued until the temperature reached 76° C. and the remaining monomer dispersion and initiator solution were added over a 2 hour period. The emulsion was then held at 76° C. for 30 minutes. The temperature was raised to 80° C. and a solution of 0.5 g of sodium persulfate in 10 g of water was added all at once. The emulsion was held at 80° C. for 30 minutes, then cooled and filtered through a 150 mesh (100 micron) bag.

Physical properties and adhesive properties are summarized in Tables 3 and 4.

Example 9

The procedure of Example 8 was used. The monomer dispersion was the same as Example 8 except that the acrylic acid was raised to 12 g and the Abex 23S surfactant was raised to 14.4 g. The initiator solution consisted of 3.8 g sodium persulfate, 4 g sodium bicarbonate and 60 g water.

Physical properties and adhesive properties are summarized in Tables 3 and 4.

Example 10

The procedure of Example 8 was used. The monomer dispersion was identical to Example 8 except that the sodium vinyl sulfonate was omitted. The initiator solution consisted of 3.8 g sodium persulfate, 4 g sodium bicarbonate and 60 g water.

Physical properties and adhesive properties are summarized in Tables 3 and 4.

TABLE 3

| Example | 8 | 9 | 10 |
| --- | --- | --- | --- |
| % Nonvolatiles | 58.14 | 57.04 | 57.54 |
| Grit (ppm) | 397 | 925 | 337 |
| pH (as made) | 5.88 | 6.26 | 6.26 |
| Viscosity (as made, cps) | | | |
| 30 rpm | 160 | 244 | 268 |
| 60 rpm | 138 | 192 | 210 |
| pH adjustment | 7.49 | 7.53 | 7.55 |
| Viscosity (after pH adj) | | | |
| 30 rpm | 264 | 364 | 424 |
| 60 rpm | 210 | 272 | 320 |
| Optical Density (0.2% solids) | | | |
| as made | 2.95 | 2.90 | 2.89 |
| after pH adjustment | 2.95 | 2.88 | 2.87 |

The optical densities before and after pH adjustment indicate that the polymers of Examples 8–10 are substantially insoluble in alkali.

The polymers of Examples 8–10 were coated (about 25 g/m² dry deposit) on Polyslik release paper, dried for 10 minutes at 70° C. and the dry adhesive laminated to Kromkote paper label stock. See Table 4 for results.

TABLE 4

| Example | 180° Peel Adhesion (N/m) | 178° Shear Adhesion (1.27 × 1.27 cm, 500 g load) (hr to failure) | Loop Tack (N/m) | Polyken Probe Tack (g) |
| --- | --- | --- | --- | --- |
| 8 | 700 | 108 | 333 | 394 |
| 9 | 578 | 3.4 | 508 | 389 |
| 10 | 841 | 3.3 | 613 | 637 |

Example 11

The procedure of Example 8 was used.

The reactor was charged with 182.5 g Example 1 first stage emulsion and 100 g deionized water. The pH was adjusted to 5.5 with aqua ammonia.

The monomer dispersion consisted of 158 g deionized water, 14.4 g Abex 23S surfactant, 8 g sodium vinyl sulfonate solution, 2 g acrylic acid, 400 g 2-ethylhexyl acrylate, 30 g methyl methacrylate, 10 g styrene and 12 g hydroxypropyl acrylate. The pH of the dispersion was adjusted to 5.5 with aqua ammonia. The initiator solution consisted of 1.5 g sodium persulfate, 40 g water and 2 g sodium bicarbonate.

The non-volatile content of the resulting polymer emulsion was 55.34%, the pH 5.88 and the viscosity 432 cps at 30 rpm and 314 cps at 60 rpm. After adjusting pH to 8.0 and the non-volatiles to 52%, the viscosity was 1016 cps at 30 rpm.

Adhesion data can be found in Table 5.

Example 12

A two liter jacketed reactor was equipped with a turbine stirrer, thermocouple, feed line for nitrogen sparge and two metering pumps. To this reactor was charged 145 g of deionized water.

An aqueous monomer/first stage oligomer dispersion consisting of 175.1 g Example 1 first stage oligomer emulsion, 172.5 g deionized water, 23.04 g Abex 23S surfactant, 12.8 g sodium vinyl sulfonate, 3.2 g acrylic acid, 8.3 g 284 aqueous ammonia, 640 g butyl acrylate and 19.2 g hydroxypropyl acrylate was prepared. An initiator solution of 2.43 g sodium persulfate, 50 g deionized water and 3 g sodium bicarbonate was also prepared.

20 g of the monomer/oligomer dispersion was added to the reactor, The reactor contents were heated to 65° C. and 5 g initiator solution was added. Heating was continued until temperature reached 76° C. and the remaining monomer/oligomer dispersion and initiator solution were added over a three hour period.

The emulsion was then held at 76° C. for 30 min. The temperature was then raised to 80° C., a solution of 0.8 g sodium persulfate in 10 g deionized water was added all at once and the temperature was held at 80° C. for one hour in order to scavenge any residual monomer. The emulsion was cooled and filtered through a 100 micron filter bag. The grit content was 0.035%. The non-volatile content was 59.36%, the pH 6.14 and the viscosity 400cps at 30 rpm and 282 cps at 60 rpm.

The pH of the emulsion was adjusted to 8.0 with aqueous ammonia. The viscosity of the emulsion 960 cps at 57.3% non-volatiles. The emulsion was coated on Polyslik release paper and dried for 10 min at 70° C. The deposit level was 26.6 g/m² and the coating was free of voids. The adhesive was transferred to 2 mil polyester film and tested using PSTC procedures.

Example 13

The procedure of Example 8 was used.

The reactor was charged with 100 g of Example 1 first stage emulsion and 100 g deionized water. The pH was raised to 6.4 with aqua ammonia.

The monomer dispersion consisted of 150 g deionized water, 10 g Abex 23S surfactant, 10 g sodium vinyl sulfonate solution, 300 g ethylhexyl acrylate, 70 g butyl acrylate and 8 g acrylic acid. The pH was adjusted to 6.8 with aqua ammonia.

The initiator solution consisted of 1.6 g sodium persulfate, 2 g sodium bicarbonate and 25 g deionized water.

The non-volatile content of the polymer emulsion was 55.48%, the pH 6.78 and the viscosity 144 cps at 30 rpm and 132 cps at 60 rpm.

Adhesion data can be found in Table 5.

Example 14

This example was similar to Example 13 except that no first stage emulsion was used. The procedure of Example 8 was used.

The reactor was charged with 160 g of deionized water. The monomer dispersion consisted of 125 g deionized water, 20 g Abex 23S surfactant, 10 g sodium vinyl sulfonate solution, 300 g ethylhexyl acrylate, 70 g butyl acrylate, 30 g methyl methacrylate and 4 g acrylic acid.

The initiator solution consisted of 3.2 g ammonium persulfate and 10 g deionized water.

The non-volatile content of the polymer emulsion was 54.50%, the pH 1.82 and the viscosity 340 cps at 30 rpm and 230 cps at 60 rpm.

This emulsion would not coat Polyslik release paper. It would not coat when the pH of this emulsion was raised to 8.56. It was necessary to add a wetting agent before the emulsion would coat Polyslik release paper.

Thus the first stage emulsion is necessary to confer coatability on the pressure sensitive adhesive emulsion polymer.

Example 15

The procedure of Example 8 was used.

The reactor was charged with 180 g Example 4 first stage emulsion and 140 g of deionized water. The pH was adjusted to 5.5 with aqua ammonia.

The monomer dispersion consisted of 220 g deionized water, 23.04 g Abex 23S surfactant, 3.2 g acrylic acid, 640 g butyl acrylate and 19.2 g hydroxypropyl acrylate. The pH of the dispersion was adjusted to 5.5 with aqua ammonia.

The initiator solution consisted of 6.08 g sodium persulfate, 6.4 g sodium bicarbonate and 100 g water.

The non-volatile content of the polymer emulsion was 55.7%, the pH 6.12 and the viscosity 364 cps at 30 rpm and 258 cps at 60 rpm.

Example 16

The procedure of Example 8 was used.

The reactor was charged with 182.5 g Example 1 first stage emulsion and 90 g surfactant deionized water. The pH was adjusted to 5.5 with aqua ammonia.

The monomer dispersion consisted of 113 g deionized water, 14.4 g Abex 23S surfactant, 8 g sodium vinyl sulfonate solution, 2 g acrylic acid, 400 g butyl acrylate, 40 g butyl methacrylate and 12 g hydroxypropyl acrylate. The pH of the dispersion was adjusted to 5.52 with aqua ammonia. The initiator solution consisted of 1.5 g sodium persulfate, 40 g deionized water and 2 g sodium bicarbonate.

The non-volatile content of the polymer emulsion was 57.89%, the pH, 5.75, and the viscosity 520 cps at 30 rpm and 358 at 60 rpm.

Adhesion data can be found in Table 5.

Example 17

The procedure of Example 8 was used.

The reactor was charged with 152 g of Example 3 first stage emulsion and 156 g deionized water. The pH was adjusted to 5.49 with aqua ammonia.

The monomer dispersion consisted of 178 g deionized water, 23.04 g Abex 23S surfactant, 3.2 g acrylic acid, 640 g butyl acrylate, 12.4 g styrene and 19.2 g hydroxypropyl acrylate. The pH of the dispersion was adjusted to 5.51 with aqua ammonia.

The initiator solution consisted of 6.08 g sodium persulfate, 6.4 g sodium bicarbonate and 100 g deionized water.

The non-volatiles content of the polymer emulsion was 57.07%, pH, 6.23, and the viscosities 1024 cps at 30 rpm and 700 cps at 60 rpm.

The adhesion data can be found in Table 5. The substrate was Kromkote paper label stock except for Examples 15 and 17 where the substrate was 2 mil polyethylene terephthalate film.

TABLE 5

| Example | 180° Peel Adhesion (N/m) | 178° Shear Adhesion (1.27 × 1.27 cm, 500 g load) (hr to failure) | Loop Tack (N/m) | Polyken Probe Tack (g) |
| --- | --- | --- | --- | --- |
| 11 | 595 | 2 | 455 | 492 |
| 12 | 657 | 2.5 | 499 | — |
| 13 | 543 | 2.1 | 438 | — |
| 15 | 455 | 0.9 | 473 | 756 |
| 16 | 806 | 13 | 298 | 506 |
| 17 | 806 | 0.9 | 420 | 562 |

Example 18

The polymer described in Example 8 was used. The polymer emulsion was formulated with rosin and hydrocarbon/rosin tackifiers. Aquatac (Arizona) and Tacolyn 1070 (Hercules) tackifiers are examples of rosin ester tackifiers. Snowtack 301A and Snowtack 375F (Eka Nobel) are examples of rosin acid tackifiers. Snowtack 820A and Snowtack 830A tackifiers are examples of hydrocarbon/rosin tackifier blends. The emulsion was transfer coated from Polyslik™ release paper to 2 mil polyethylene terephthalate film as described in Example 5. The performance data is shown in Tables 6–8.

TABLE 6

90° Peel Adhesion (N/m) to Stainless Steel

| Tackifier (wt %) | Aquatac 6085 | Tacolyn 1070 | Snowtack 301A | Snowtack 375F | Snowtack 820A | Snowtack 830A |
|---|---|---|---|---|---|---|
| 0 | 228 | 228 | 228 | 228 | 228 | 228 |
| 10 | — | — | 298 | — | — | — |
| 15 | 333 | 350 | 298 | 315 | 403 | 315 |
| 20 | — | — | 368 | — | — | — |
| 30 | 385 | 333 | 560 | 525 | 403 | 315 |
| 40 | — | 525 | 595 | 525 | 350 | 385 |

TABLE

Loop Tack to Stainless Steel (N/m)

| Tackifier (wt %) | Aquatac 6085 | Tacolyn 1070 | Snowtack 301A | Snowtack 375F | Snowtack 820A | Snowtack 830A |
|---|---|---|---|---|---|---|
| 0 | 350 | 350 | 350 | 350 | 350 | 350 |
| 10 | — | — | 438 | — | — | — |
| 15 | 490 | 455 | 455 | 490 | 438 | 508 |
| 20 | — | — | 508 | — | — | — |
| 30 | 666 | 543 | 753 | 595 | 280 | 473 |
| 40 | — | 736 | 806 | 718 | 228 | 333 |

TABLE 8

178° Shear Strength (hr to failure)
(2.54 cm × 2.54 cm × 1 kg load)

| Tackifier (wt %) | Aquatac 6085 | Tacolyn 1070 | Snowtack 301A | Snowtack 375F | Snowtack 820A | Snowtack 830A |
|---|---|---|---|---|---|---|
| 0 | 170 | 170 | 170 | 170 | 170 | 170 |
| 15 | — | 100 | 52 | 30 | 27 | 35 |
| 20 | — | — | 15 | — | — | — |
| 30 | 4 | 50 | 11 | 21 | 5 | 5 |
| 40 | — | 42 | 6 | 9 | 2 | 2 |

EXAMPLE 19

First Stage Emulsion

A jacketed three gallon (~11 l) stainless steel reactor was equipped with a turbine agitator, thermocouples, and feed metering pumps.

To the reactor was charged 2640 g deionized water. The reactor was sparged with nitrogen to displace the air. An initiator solution consisting of 240 g deionized water and 60 g ammonium persulfate was prepared. A monomer dispersion consisting of 2760 g deionized water, 60 g Abex JKB surfactant (Rhone Poulenc), 888 g methacrylic acid, 2496 g ethylhexyl acrylate, 72 g acrylic acid, 384 g vinyl acetate, and 120 g n-dodecyl mercaptan was prepared.

The reactor contents were heated to 80° C. and when that temperature was reached, the initiator solution was added all at once. The monomer dispersion was added over a 2-hour period while maintaining the temperature at 80° C. After the addition was completed, the reaction mixture was held at 80° C. for 30 minutes. A solution consisting of 6 g ammonium persulfate and 60 g water was added all at once and the reactor raised to 90° C. to complete polymerization of any residual monomer. The emulsion was cooled, adjusted to pH 5.49 with 284 g 28% aqua ammonia and filtered. The non-volatile content was 39.27% and the viscosity was 20 cps (#3 spindle @ 30 rpm), Mn=5187.

Adhesive Polymer Emulsion

A 2 liter jacketed glass reactor was equipped with a turbine stirrer, thermocouple, feed line for nitrogen sparge, and two metering pumps.

To the reactor was charged 179.7 g of the above first stage emulsion and 138.3 g deionized water. The reactor was sparged with nitrogen.

A monomer dispersion consisting of 140 g deionized water, 46.08 g Abex JKB surfactant, 19.2 g 254 solution of sodium vinyl sulfonate, 3.2 g acrylic acid, 576 g butyl acrylate, 64 g ethylhexyl acrylate, and 19.2 g hydroxypropyl acrylate was prepared. The pH was adjusted to 5.5 with aqua ammonia.

An initiator solution of 1.8 g sodium persulfate, 50 g water, and 3 g sodium bicarbonate was prepared.

Fifteen g of the monomer dispersion was added to the reactor. The reactor contents were heated to 65° C. and 5 g initiator solution was added. Heating was continued until the temperature was 76° C. and the remaining monomer dispersion and initiator solution were added over a 2 hour period.

The emulsion was then held at 76° C. for 30 minutes. The temperature was raised to 80° C. and a solution of 0.8 g sodium persulfate in 10 g water was added all at once. The emulsion was held at 80° C. for 30 minutes in order to scavenge any residual monomer.

The emulsion was then cooled and filtered through a 150 mesh (100 micron) bag.

The non-volatile content was 59.65%, the pH was 5.69, and the viscosity was 504 cps (#3 spindle @ 30 rpm) and 385 cps (#3 spindle @ 60 rpm). The pH of the emulsion was then adjusted to 7.61 with aqua ammonia. The resultant viscosity was 1044 cps (#3 spindle @ 30 rpm). The pressure sensitive adhesive polymer emulsion was tested using the described procedures. The peel adhesion was 351 N/m (2.0 lbs/in), the loop tack was 298 N/m (1.7 lbs/in) and the shear adhesion was 3.1 hours.

EXAMPLE 20

This example shows that the first stage polymer must have a Mn <15,000 in order to obtain a stable, commercially usable adhesive product.

First Stage Emulsion A

The procedure and recipe for this first stage emulsion were identical to Example 4a except that the chain transfer agent dodecyl mercaptan was omitted. The emulsion coagulated during preparation (during the delay addition of the monomer pre-emulsion).

Clearly molecular weight control of the first stage emulsion is critical. It cannot even be prepared in the absence of chain transfer agent.

First Stage Emulsion B

The procedure and recipe for this first stage emulsion were identical to Example 19 except that 30 g of dodecyl mercaptan was used instead of 120 g.

Physical properties of emulsion were: Non-volatiles 39.02%, pH 5.5, Brookfield viscosity 72 cps (#3 spindle @ 30 rpm), 72 cps (#3 spindle @ 60 rpm), Mn=16,341, Mw=59,010.

Second Stage Adhesive Polymer Emulsion

The procedure and composition of Example 8 was used except that first stage emulsion B was used. Physical properties of the aqueous adhesive polymer emulsion: Non-volatiles 58.48%, pH 7.5, Brookfield viscosity 1476 cps (#3 spindle @ 30 rpm, model LV viscometer).

However, within less than 48 hours, the viscosity of the aqueous adhesive composition made with first stage emulsion B rose to 181,300 cps (#5 spindle @ 1 rpm, model RV viscometer) or 292,000 cps (#3 spindle @ 0.3 rpm, model LV viscometer). Clearly, this adhesive composition is not stable and therefore not usable.

EXAMPLE 21

In this Example an attempt was made to produce a usable adhesive by replacing Abex 23-S surfactant of Example 20 with Abex JKB surfactant. Thus, 9.6 g of Abex JKB surfactant was used because the non-volatiles of Abex JKB surfactant is 304 whereas the non-volatiles of Abex 23-S surfactant is 604.

Physical properties of the aqueous adhesive polymer composition: Non-volatiles 57.0%, pH 7.5, Brookfield viscosity 3380 cps (#3 spindle @ 5 rpm, model LV viscometer).

Within 24 hours, the viscosity rose to 80,800 cps {#5 spindle @ 1 rpm, model RV viscometer). After 48 hours, the viscosity was 85,000 cps.

Again, the adhesive composition made with the first stage polymer of Mn=16,341 was neither stable nor usable.

EXAMPLE 22

This example compares the solution polymerization process of CA 814,528 with an aqueous emulsion polymerization for the preparation of a substantially alkali insoluble, low molecular weight carboxylate-containing first stage polymer under acidic conditions.

Into a 2 liter resin kettle equipped with reflux condenser, a nitrogen sparge, an agitator, and ports for the introduction of monomors and initiator, was charged 400 g of methyl isobutyl ketone (MIBK).

A monomer mixture consisting of 416 g 2-ethylhexyl acrylate, 148 g methacrylic acid, 64 g vinyl acetate, and 12 g acrylic acid was prepared. Dodecyl mercaptan was not used as a chain transfer agent in this solution polymerization since the MIBK is an effective chain transfer agent.

An initiator solution consisting of 35 g benzoyl peroxide and 300 g MIBK was prepared. (Benzoyl peroxide was used since ammonium persulfate is not soluble in MIBK.)

The reactor was heated to the reflux temperature of MIBK and the monomer mixture and the initiator solution were added over a two hour period while maintaining the reflux temperature of MIBK. After completion of the additions, the reaction was held for one hour at the reflux temperature. Then a solution of 3.5 g benzoyl peroxide in 30 g MIBK was added to consume any residual monomer. The reaction mixture was held at the reflux temperature for two hours. The reactor was equipped for distillation and MIBK was distilled off until the temperature of the reaction mixture reached 135° C. MIBK collected, 582.2 g.

The mixture was then cooled to 90° C. and 1000 g hot deionized water and 50 g of 28% aqua ammonia were added (see ex. 3, Can Pat. '528). Distillation was resumed and 137.5 g MIBK and 493 g water were collected. The reaction mixture was very thick at 100° C.

Two hundred g deionized water was added and aqua ammonia was added until the pH was 7.53 at 75° C. When cooled to room temperature, the mixture was not stirrable. The Brookfield viscosity was 1,280,000 cps (#7 spindle @ 0.5 rpm) and 992,000 cps (#7 spindle @ 1.0 rpm). The non-volatile content (oven solids by drying at 150° C. for 30 min.) was 46.5%. The dried residue was a clear yellow friable solid.

The reaction mixture was a translucent jelly-like material. A portion of the mixture was diluted to 0.2% solids and the optical density was determined.

A portion of this dilute material, while being stirred, was acidified. The polymer precipitated as large, non-dispersible lumps. The molecular weight of the product was also determined. The monomer composition was reacted according to the Example 1 first stage emulsion polymer process and the resulting product is compared to the product prepared by the above first stage solution process in Table 8.

TABLE 8

FIRST STAGE POLYMER COMPARISON

| Composition | Emulsion Process | Solution Process |
|---|---|---|
| EHA | 65% | 65% |
| MAA | 23.13 | 23.13 |
| VA | 10 | 10 |
| AA | 1.87 | 1.87 |
| Optical Density (0.2% solids) | | |
| pH 4.5 | 2.97 | unstable |
| pH 7.5 | 2.94 | 0.053 |
| Viscosity cps (pH 7.5) | 40% solids 48 cps | 46.5% solids 992,000 cps |
| Molecular Weight | | |
| Mw | 10,661 | 10,343 |
| Mn | 5,187 | 3,849 |
| Stability of Mixture | | |
| pH < 7 | stable emulsion | not dispersible |
| pH > 7 | stable emulsion | soluble |

Clearly from the data in Table 8, polymerization processes are not generic. The emulsion process produces an alkali- and acid-stable emulsion. The emulsion polymer is substantially insoluble above pH 7 as well as insoluble below 7 and the emulsion is very low viscosity.

The solution polymer forms neither an alkali- nor acid-stable dispersion. It is substantially soluble above pH 7 and precipitates as a non-dispersible solid when the solution is acidified. The viscosity of the 464 solids solution of the solvent polymer at pH 7.5 is so high as to be unusable in the second stage polymerization.

Example 23

First Stage Emulsion

A 2 liter jacketed glass reactor was equipped with a turbine stirrer, thermocouple, feed line for nitrogen sparge and a metering pump.

To the reactor was charged 440 g of deionized water. The reactor was swept with nitrogen. A monomer dispersion consisting of 460 g deionized water, 20 g Abex JKB surfactant, 64 g methyl acrylate, 896 g ethylhexyl acrylate, 180 g methacrylic acid, and 20 g dodecyl mercaptan was prepared.

An initiator solution consisting of 20 g ammonium persulfate, 5 g sodium bicarbonate, and 40 g of deionized water was prepared.

The reactor contents was heated to 80° C. and the initiator solution was added all at once. The monomer dispersion was added over a 2 hour period. After the delayed addition was complete, the reaction mixture was held at 80° C. for 30 minutes. The temperature was raised to 90° C. and a solution of 1 g ammonium persulfate in 10 g water was added all at once. The reaction mixture was held at 90° C. for 30 minutes to scavenge any residual monomer. The mixture was cooled and filtered to remove any coagulum. The emulsion was then characterized. The physical properties are listed in Table 9.

Example 24

First Stage Emulsion

The reactor and procedure of Example 23 was used.

The reactor charge was 240 g deionized water.

The monomer dispersion consisted of 460 g deionized water, 10 g Abex JKB surfactant, 384 g ethylhexyl acrylate, 180 g methacrylic acid, 12 g acrylic acid, 64 g vinyl propionate, and 20 g dodecyl mercaptan.

The initiator solution consisted of 10 g ammonium persulfate and 40 g deionized water. After cooling the reaction mixture, its pH was adjusted to 4.5 with aqua ammonia. The physical properties are listed in Table 9.

Example 25

First Stage Emulsion

The reactor and procedure of Example 23 were used.

The reactor charge was 440 g deionized water.

The monomer dispersion consisted of 460 g deionized water, 10 g Abex JKB surfactant, 407 g ethylhexyl acrylate, 180 g methacrylic acid, 53 g methyl methylacrylate, and 20 g dodecyl mercaptan. The initiator solution consisted of 10 g ammonium persulfate, 7 g of sodium bicarbonate, and 80 g water.

The physical properties are listed in Table 9.

Example 26

First Stage Emulsion

The reactor described in Example 23 was modified to include two metering pumps.

The reactor charge was 440 g deionized water. The monomer dispersion consisted of 360 g deionized water, 10 g Abex JKB surfactant, 64 g butyl acrylate, 396 g ethylhexyl acrylate, g methacrylic acid, and 20 g dodecyl mercaptan. The initiator solution consisted of 10 g ammonium persulfate and 40 g deionized water. A buffer solution consisting of 8.5 g sodium bicarbonate and 100 g deionized water was prepared.

The reactor contents were heated to 80° C. and the initiator solution was added all at once. The monomer dispersion and the buffer solution were separately fed to the reactor over a 2 hour period. After additions were completed, the reaction mixture was held at 80° C. for 30 minutes.

The reaction temperature was raised to 90° C. and a solution of 1 g ammonium persulfate and 20 g water was added. The mixture was held at 90° C. for 30 minutes to scavenge any residual monomer.

The reaction mixture was cooled and filtered to remove any coagulum. The emulsion was characterized. The physical properties are listed in Table 9.

TABLE 9

| | Physical Properties | | |
|---|---|---|---|
| Example | pH | % Solids | Viscosity[1] |
| 23 | 3.26 | 41.24 | 48 cps |
| 24 | 4.50 | 46.60 | 56 |
| 25 | 4.50 | 40.39 | 24 |
| 26 | 4.18 | 41.48 | 16 |

[1]Brookfield Viscometer model LVT, #3 spindle @ 30 rpm.

Example 27

Second Stage Adhesive Emulsion A PSA emulsion was prepared using the Example 23 first stage emulsion.

A 2 liter jacketed glass reactor was equipped with a turbine stirrer, thermocouple, feed line for nitrogen sparge, and two metering pumps.

The reactor was charged with 90 g deionized water, 177 g of Example 23 emulsion, and the pH was adjusted to pH 5.5 with aqua ammonia.

The monomer dispersion consisted of 113 g deionized water, 14.4 g Abex 23S surfactant, 8 g sodium vinyl sulfonate solution (25% solids), 2 g acrylic acid, 400 g butyl acrylate, 40 g methyl acrylate, and 12 g hydroxylpropyl acrylate. The pH of the dispersion was adjusted to 5.52 with 1.8 g aqua ammonia.

The initiator consisted of 1.5 g sodium persulfate, 2 g sodium bicarbonate, and 40 g water.

To the reactor was added 15 g of the monomer dispersion.

The reactor was heated to 76° C. When temperature reached 65° C., 5 g of the initiator solution was added. When temperature reached 76° C., the remaining monomer dispersion and initiator solution was added over a 2 hour period.

When additions were completed, the reaction mixture was held at 76° C. for 15 minutes. The temperature was then raised to 80° C. and 0.5 g ammonium persulfate dissolved in 10 g water was added. The reaction mixture was held at 80° C. for 3 hours to scavenge any residual monomer.

The reaction mixture was cooled to room temperature and filtered to remove any coagulum. The emulsion was characterized. The physical properties are listed in Table 10 and the adhesive performance values are listed in Table 11.

Example 28

Second Stage Adhesive Emulsion

A PSA adhesive emulsion was prepared using Example 24 first stage emulsion.

The reactor was that described in Example 27.

The reactor was charged with 169.6 g deionized water and 150.4 g of Example 24 first stage emulsion. The pH was adjusted to 5.50 with 2.9 g aqua ammonia.

The monomer dispersion consisted of 20 g deionized water, 23.03 g Abex 23S surfactant, 3.2 g acrylic acid, 640 g butyl acrylate, 19.2 g hydroxyethyl methacrylate, and was adjusted to pH 5.51 with 2.5 g aqua ammonia.

The initiator solution consisted of 4.16 g sodium persulfate, 5 g sodium bicarbonate, and 70 g water.

The procedure was identical to that used in Example 27.

The physical properties are listed in Table 10 and the adhesive performance in Table 11.

Example 29

Second Stage Adhesive Emulsion

A PSA adhesive emulsion was prepared using Example 25 first stage emulsion.

The reactor was that described in Example 27.

The reactor was charged with 145.7 g deionized water and 174.3 g of Example 25 first stage emulsion. The pH was adjusted to 5.64 with 2.5 g aqua ammonia.

The monomer dispersion consisted of 172.9 g deionized water, 223 g Abex 23S surfactant, 6.4 g of sodium vinyl sulfonate solution (25% solids), 8.2 g acrylic acid, 640 g butyl acrylate, and 19.2 g hydroxylpropyl acrylate. The pH was adjusted to 5.5 with 2.5 g aqua ammonia.

The initiator solution consisted of 1.8 g sodium persulfate, 3 g sodium bicarbonate, and 50 g water.

The procedure was identical to that used in Example 27.

The physical properties are listed in Table 10 and adhesive performance in Table 11.

Example 30

Second Stage Adhesive Emulsion

A PSA adhesive emulsion was prepared using Example 26 first stage emulsion.

The reactor was that described in Example 27.

The reactor was charged with 144 g deionized water, 141 g Example 26 first stage emulsion, and was adjusted to pH 5.50 wit 3.2 g aqua ammonia.

The monomer dispersion consisted of 181 g deionized water, 7.7 g Abex 23S surfactant, 12.8 g sodium vinyl sulfonate solution (25% solids), 32 g acrylic acid, 640 g butyl acrylate, and 19.2 hydroxypropyl acrylate. The pH was adjusted to 5.50 with 3.2 g aqua ammonia.

The initiator solution consisted of 2.4 g sodium persulfate, 3.2 g sodium bicarbonate, and 64 g water.

The procedure was identical to that used in Example 27.

The physical properties are listed in Table 10 and adhesive performance in Table 11.

TABLE 10

| | Physical Properties | | |
|---|---|---|---|
| Example | pH | % Solids | Viscosity[1] |
| 27 | 5.70 | 58.52 | 1936 cps |
| 28 | 6.14 | 57.34 | 356 |
| 29 | 6.04 | 58.39 | 1076 |
| 30 | 6.08 | 58.98 | 160 |

[1]Brookfield Viscometer model LVT, #3 spindle @ 30 rpm.

TABLE 11

| | Adhesive Performance | | |
|---|---|---|---|
| Example | 180° Peel[2] | Loop Tack | Shear[3] |
| 27 | 351 N/M | 175 N/M | 4.4 hrs |
| 28 | 333 | 298 | 4.2 |
| 29 | 456 | 421 | 3.5 |
| 30 | 175 | 175 | 43.7 |

[1]All tests used a Mylar film substrate and a stainless steel test panel.
[2]30 minute dwell time.
[3]Shear adhesion, 1.27 cm × 1.27 cm in contact, 0.5 kg load.

STATEMENT OF INDUSTRIAL APPLICATION

The present invention provides a pressure-sensitive adhesive emulsion polymer suitable for use on label stock. Other uses include decals, tapes, self-adhesive decorative papers and films such as PSA coated printed PVC film.

We claim:

1. A process for producing a stable aqueous pressure sensitive adhesive polymer emulsion which comprises
   (a) preparing a substantially alkali insoluble, low molecular weight carboxylate-containing first stage polymer by aqueous emulsion polymerization under acidic conditions, the first stage emulsion polymer containing 30 to 55 equivalent % carboxylate monomers and having a Mn of <15,000 and a Tg<25° C. as measured by Dynamic Mechanical Analysis,
   (b) conducting a second emulsion polymerization in the presence of the first stage polymer under acidic or basic conditions to produce a hydrophobic second stage polymer, the combination of monomers used in the first stage and second stage polymerizations resulting a two stage pressure sensitive adhesive emulsion polymer and (c) optionally, adjusting the pH of the resulting two stage pressure sensitive adhesive polymer emulsion to pH≧4.

2. The process of claim 1 in which the second stage polymerization is conducted under acidic conditions.

3. The process of claim 1 in which the second stage polymerization is conducted under basic conditions.

4. The process of claim 1 in which the first stage polymer has a Mn of 5000 to 10,000.

5. The process of claim 1 in which the first stage polymer is prepared from monomers selected from the group consisting of esters of acrylic acid with $C_1$–$C_{12}$ alcohols, esters of methacrylic acid with $C_1$–$C_{12}$ alcohols, vinyl esters of $C_2$–$C_5$ carboxylic acids, acrylonitrile, styrene, α-methylstyrene, and olefinically unsaturated $C_3$–$C_6$ carboxylic monomers.

6. The process of claim 1 in which the second stage polymer is prepared from monomers selected from the group consisting of esters of acrylic acid with $C_1$–$C_{12}$ alcohols, esters of methacrylic acid with $C_1$–$C_{12}$ alcohols, esters of maleic acid with $C_1$–$C_{12}$ alcohols, vinyl esters of $C_2$–$C_5$ carboxylic acids, styrene, α-methylstyrene, acrylonitrile, $C_2$–$C_4$ hydroxyalkyl acrylate, $C_2$–$C_4$ hydroxyalkyl methacrylate, olefinically unsaturated $C_3$–$C_6$ carboxylic monomers and sodium vinyl sulfonate.

7. The process of claim 1 in which the first stage polymer contains 35–50 equivalent % carboxylate monomers.

8. The process of claim 1 in which the first stage polymer comprises 5–25 wt % of the resultant emulsion polymer solids.

9. The process of claim 1 in which the first stage polymer comprises 8–15 wt % of the resultant emulsion polymer solids.

10. A process for producing a stable aqueous pressure sensitive adhesive polymer emulsion which comprises (a) preparing a substantially alkali insoluble carboxylate-containing first stage polymer having a Mn <15,000 by aqueous emulsion polymerization under acidic conditions, the first stage polymer consisting essentially of (i) monomers selected from the group consisting of esters of acrylic with $C_1$–$C_{12}$ alcohols, esters of methacrylic acid with $C_1$–$C_{12}$ alcohols, vinyl esters of $C_2$–$C_5$ carboxylic acids, acrylonitrile, styrene, and α-methylstyrene, and (ii) 30 to 55 equivalent % olefinically unsaturated $C_3$–$C_6$ carboxylic monomers and having a Tg≦0° C. (as measured by Dynamic Mechanical Analysis), (b) conducting a second emulsion polymerization in the presence of 5–25 wt % first stage polymer, based on resultant emulsion polymer solids, under acidic or basic conditions to produce a hydrophobic second stage polymer, the second stage polymer consisting essentially of monomers selected from the group consisting of esters of acrylic acid with $C_1$–$C_{12}$ alcohols, esters of methacrylic acid with $C_1$–$C_{12}$ alcohols, esters of maleic acid with $C_1$–$C_{12}$ alcohols, vinyl esters of $C_2$–$C_5$ carboxylic acids, styrene, α-methylstyrene, acrylonitrile, $C_2$–$C_4$ hydroxyalkyl acrylate, $C_2$–$C_4$ hydroxyalkyl methacrylate, olefinically unsaturated $C_3$–$C_6$ carboxylic monomers and sodium vinyl sulfonate, the combination of monomers used in the first stage and second stage polymerizations resulting in a two stage pressure sensitive adhesive emulsion polymer and (c) optionally, adjusting the resulting two stage pressure sensitive adhesive polymer emulsion to pH>6.

11. The process of claim 10 in which the first stage polymer has a Mn of 5000 to 10,000.

12. The process of claim 10 in which the first stage polymer contains 35 to 50 equivalent % carboxylic monomers.

13. The process of claim 10 in which the first stage polymer comprises 8–15 wt % of the resultant emulsion polymer.

14. The process of claim 10 in which the resulting two stage polymer emulsion is adjusted to pH>7.

15. The process of claim 10 in which the second stage polymerization is conducted under acidic conditions.

16. A process for producing a stable aqueous pressure sensitive adhesive polymer emulsion which comprises (a) preparing a substantially alkali insoluble carboxylate-containing first stage polymer having a Mn≦10,000 and a Tg≦0° C. (as measured by Dynamic Mechanical Analysis) by aqueous emulsion polymerization under acidic conditions, the first stage polymer consisting essentially of (i) monomers selected from the group consisting of esters of acrylic acid with $C_1$–$C_{12}$ alcohols, esters of methacrylic acid with $C_1$–$C_{12}$ alcohols, vinyl esters of $C_2$–$C_5$ carboxylic acids, acrylonitrile, styrene, and α-methylstyrene, and (ii) 35–50 equivalent % olefinically unsaturated $C_3$–$C_6$ carboxylic monomers, (b) conducting a second emulsion polymerization in the presence of 8–15 wt % first stage polymer, based on resultant emulsion polymer solids, under acidic or basic conditions to produce a hydrophobic second stage polymer, the second stage polymer consisting essentially of monomers selected from the group consisting of esters of acrylic acid with $C_1$–$C_{12}$ alcohols, esters of methacrylic acid with $C_1$–$C_{12}$ alcohols, esters of maleic acid with $C_1$–$C_{12}$ alcohols, vinyl esters of $C_2$–$C_5$ carboxylic acids, styrene, α-methylstyrene, acrylonitrile, $C_2$–$C_4$ hydroxyalkyl acrylate, $C_2$–$C_4$ hydroxyalkyl methacrylate, olefinically unsaturated $C_3$–$C_6$ carboxylic monomers and sodium vinyl sulfonate, the combination of monomers used in the first stage and second stage polymerizations resulting in a two stage pressure sensitive adhesive emulsion polymer and (c) optionally, adjusting the resulting two stage pressure sensitive adhesive polymer emulsion to pH >7.

17. The process of claim 15 in which the first stage polymer consists essentially of vinyl acetate, 2-ethylhexyl acrylate, acrylic acid and methacrylic acid.

18. The process of claim 17 in which the second stage polymer consists essentially of monomers selected from the group consisting of sodium vinyl sulfonate, acrylic acid, methacrylic acid, methyl acrylate, methyl methacrylate, butyl acrylate, 2-ethylhexyl acrylate, hydroxyethyl methacrylate, hydroxypropyl acrylate and styrene.

19. The process of claim 18 in which the second stage polymerization is conducted under acidic conditions.

20. The process of claim 1 which further comprises blending an aqueous tackifying resin dispersion into the aqueous adhesive polymer emulsion.

21. The process of claim 10 which further comprises blending an aqueous tackifying resin dispersion into the aqueous adhesive polymer emulsion.

22. The process of claim 16 which further comprises blending an aqueous tackifying resin dispersion into the aqueous adhesive polymer emulsion.

23. The process of claim 19 which further comprises blending an aqueous tackifying resin dispersion into the aqueous adhesive polymer emulsion.

* * * * *